2,868,748

EMULSIONS OF ACRYLIC POLYMERS

Charles Frazier, Yonkers, N. Y., and James H. Fortune, Springdale, Conn., assignors to American Cyanamid Company, New York, N. Y., a corporation of Maine No Drawing. Application September 23, 1955
Serial No. 536,301

12 Claims. (Cl. 260—27)

This invention relates to synthetic thermoplastic latex compositions comprising the reaction product of at least three different polymerizable monoethylenic monomers containing a vinyl or $CH_2=C<$ group. More particularly, this invention relates to a freeze-thaw and mechanically stable copolymer latex composition which utilizes an emulsifier system comprising three components in combination with a polymerizable α-unsaturated monocarboxylic acid having 3 to 5 carbon atoms as one of the monomers which are copolymerized.

Copolymers made from monoethylenic monomers containing a vinyl $CH_2=C<$ group in aqueous emulsion have been found very useful as surface coatings, paper coatings, textiles and adhesives, among other uses. The problem heretofore has been in finding suitable emulsifying agents to polymerize these compounds into a copolymer of sufficient stability, suitable homogeneity, and sufficiently high solids content and which provide a continuous film when compositions containing these emulsions are air-dried. The advantages of making compositions which resist breakdown and/or coagulation due to alternate freezing and thawing of the aqueous latex system and also which are capable of withstanding the mechanical stress resulting from processing and handling operations are readily apparent. The processing, handling, distribution, and storage of paints and other coating compositions incorporating these emulsions requires that they withstand severe mechanical agitation and extreme temperature variations ranging from temperatures well below the freezing point of water to those well in excess of 100° F. Under these severe conditions, the entire composition may freeze irreversibly into a mass or coagulate to an extent as would destroy their usefulness. It is therefore desirable that these latex emulsion compositions be capable of withstanding such severe conditions without losing any of their original properties when agitated or upon thawing from the frozen state.

It is the object of this invention to provide a freeze-thaw and mechanically stable latex emulsion copolymer compositon comprising (1) a polymerizable α-unsaturated monocarboxylic acid having 3 to 5 carbon atoms, i. e., a lower acrylic acid, as one of the polymerizable monomers, (2) an emulsifier system comprising 3 components, and (3) at least two monomers which contain the $CH_2=C<$ group and which differ from the α-unsaturated monocarboxylic acid monomer, to produce a product of high conversion and substantially free from coagulation. Other objects will become apparent from the following description.

Heretofore, difficulty has been experienced in attempts to use a specific emulsifier, which has been found to work well with a particular copolymer composition to polymerize different monomer combinations or even different proportions of the same combination, so as to produce an emulsion having a sufficiently high solids content and good freeze-thaw and mechanical stability and at the same time being free from coagulation. According to the teaching of this invention, the emulsion copolymerization of various combinations of monomers, and in various proportions using a novel emulsifier system herein disclosed is possible. The latex emulsions produced according to the teaching of the invention have a relatively high solids content and excellent stability.

The triemulsifier system herein employed comprises a non-ionic and two anionic emulsifiers. As the non-ionic component, an alkyl aryl polyether alcohol is employed. Among such compounds, for example, are the ethylene oxide condensation product of octyl phenol available under the trade name Triton X-100 and the ethylene oxide condensation product of nonyl phenol available under the trade name Aerosol NI.

The anionic components comprise the alkali metal salts of disproportionated rosin acids. Such compounds are available commercially, for example, as Dresinate 731 and Dresinate 714, the sodium salt and the potassium salt, respectively, of disproportionated rosin acids.

The third emulsifier is an alkyl ester of sulfosuccinic acid salt. An example of such a compound is the dihexyl ester of sodium sulfosuccinic acid, which is available commercially as Aerosol MA. The diamyl ester available as Aerosol AY is an example of an alternate emulsifier that may be employed as the third component.

The emulsifiers are employed in substantially equal amounts, i. e., each of the three emulsifiers has been found effective in combination when present in amounts varying from 0.5% to 1.5% by weight and preferably about 1% by weight, based on the total weight of the monomers.

In order to obtain consistently good emulsions of high yield and excellent stability, it is necessary that one of the monomers copolymerized be a polymerizable α-unsaturated monocarboxylic acid. The acids contemplated are the lower acrylic acids, i. e., those falling within the general formula:

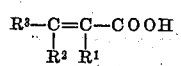

wherein "$R^1$" and "$R^2$" is "H" or an alkyl radical of 1 or 2 carbon atoms, a halogen, or an amino group and "$R^3$" is "H," a halogen, a hydroxy, or an amino group and the total number of halogen, hydroxy, and amino substituents is no greater than 1. Among such acids are acrylic, methacrylic, α,β-dimethyl acrylic, β,β-dimethyl acrylic, ethacrylic, crotonic, isocrotonic, angelic, tiglic, and the halogen, hydroxy, and amine substituted acids of the foregoing. Amounts of at least 0.5% of the polymerizable α-unsaturated monocarboxylic acids are necessary and preferably from about 1% to about 5% by weight based on the total weight of the monomers.

Among the monomers having the $CH_2=C<$ group which are copolymerizable with but which differ from the polymerizable α-unsaturated monocarboxylic acids are such as styrene, methylstyrene, dimethylstyrene, halogenated and other substituted styrenes, methyl methacrylate, ethyl acrylate, butyl acrylate, substituted acrylates, vinyl acetate, vinyl proprionate, acrylonitrile, and the like.

The preferred composition of the triemulsifier system is the ethylene oxide condensation product of octyl phenol, i. e., Triton X–100; the sodium salt of disproportionated rosin acids, i. e., Dresinate 731; and the dihexyl ester of sodium sulfosuccinic acid, i. e., Aerosol MA; and the preferred member of the polymerizable α-unsaturated monocarboxylic acid of the general formula is methacrylic acid.

To obtain the advantages of the instant invention, it is essential that the triemulsifier system and one of the α-unsaturated monocarboxylic acids having no more than 5 carbon atoms be present. One advantage of the present invention resides in the broad range of applicability of the emulsifier system in polymerizing various monomers over the shortcomings of the prior art. Also in various instances where specific emulsifiers provide good freeze-thaw stability, the mechanical stability has been very poor. Furthermore, in many instances wherein the freeze-thaw stability and mechanical stability are both good, the conversion has been found so low that use of the composition is impractical and unsuitable for many applications.

In practicing the instant invention, the three emulsifiers may be dissolved in the aqueous phase. It is preferred, however, that one of the anionic emulsifiers be dissolved in the monomer phase and the other anionic and nonionic emulsifiers be dissolved in the aqueous phase. In order to provide nearly complete monomer conversion and thereby minimize the subsequent necessity of steam stripping of the emulsion for removal of unreacted monomers, it is preferred to begin addition of the catalyst solution into the aqueous phase during the emulsion polymerization at such a rate that the addition thereof extends from a time prior to the beginning of the addition of the monomer phase until a time after all of the monomer has been added.

To ascertain the freeze-thaw and mechanical stability of the resins, the following procedures are employed. In testing for freeze-thaw properties, a portion of the emulsion is placed in a one-ounce glass bottle and is subjected to repeated freeze-thaw cycles of freezing for 16 to 18 hours at −13° C. to −16° C. and subsequent thawing at room temperature for 6 to 8 hours. Where the emulsion has not coagulated after about 10 cycles under these conditions, the emulsion is considered acceptable as resistant to irreversibility from freezing and the emulsion is then subjected to a further freezing, again at −13° C. to −16° C. for one week and is again thawed at room temperature. If the emulsion passes this test, it is then subjected to a further cycle of freezing at −13° C. to −16° C. for two weeks and thawing at room temperature. In the example hereinafter set out where results of freeze-thaw stability are expressed as greater than a given number of cycles, this includes the one-week and the two-week freeze-thaw cycle. Generally when a composition has withstood several freeze-thaw cycles without loss of desired properties, it is unimpaired by subsequent cycles.

The mechanical stability is tested according to the following procedure:

Twenty-five grams of 6 mm. glass beads are placed in a one-ounce screw cap bottle and the emulsion to be tested is added until it reaches the top level of the beads. This bottle is then tumbled on rollers until the first coagulate occurs in either the liquid or on the bottle cap. The time elapsing until the first appearance of coagulate is taken as a measure of the mechanical stability of the emulsion being tested. An emulsion failing, i. e., coagulating, in less than 24 hours is given the rating, "poor"; an emulsion failing between 24 and 100 hours is given the rating, "fair"; an emulsion failing between 100 and 350 hours is given the rating, "good"; and an emulsion passing 500 hours without exhibiting coagulant is given the rating, "excellent".

In order that the present invention may be fully understood, the following examples are set forth for the purposes of illustration only, and any specific enumeration in detail should not be interpreted as a limitation except as expressed in the appended claims. Unless otherwise stated, the monomers are employed at 50% concentration.

EXAMPLE 1

Butyl acrylate, methylstyrene, and methacrylic acid in the relative percentage weight ratio of 48:50:2, respectively, and at 50% monomer to water ratio concentration are polymerized utilizing the following components and procedure:

(I) Aqueous phase:                                 Parts by weight
   $H_2O$, de-ionized _____ 90
   Triton X–100, 20% aq., 1% of monomers ___  6.25
   Dresinate 731, 20% aq., 1% of monomers __  6.25
(II) Catalyst solution:
   $H_2O$, de-ionized _____ 25
   $(NH_4)_2S_2O_8$, 0.5% of monomers _____  .625
(III) Monomer phase:
   MS _____ 62.5
   BA _____ 60.0
   MA _____  2.5
   Aerosol MA, 1% of monomers _____  1.25
                                              ───────
                                              254.375

(IV) $NH_3$ (29% aq.) to pH=9.5–10.0.

Procedure

Into a suitable reaction vessel equipped with a reflux condenser, mechanical stirrer, inlet and outlet tubes, and thermometer, the aqueous phase (I) is heated on a steam bath with agitation and under reflux conditions. When temperature of 90° C. to 95° C. is reached, the addition of 10% of catalyst solution (II) is begun. When this amount has been added to the aqueous phase (I), start addition of the monomer phase (III), followed by (II) at such a rate that about 10% of the catalyst solution (II) remains after all of the monomer phase (III) has been added, a period consuming about 2 hours. The remainder of the catalyst solution (II) is then added and heating is continued until polymerization is substantially complete, a period which consumes about ½ hour. Residual monomers are then removed by steam stripping. The polymerized emulsion is then concentrated to about 50% solids by evaporation. Concentrated (28%) $NH_3$ is then added to raise pH to 9.5–10.0 and the latex emulsion is strained through a flannel cloth to remove any trace of coagulant. The emulsion characteristics are shown in Table 1.

EXAMPLE 2

Example 1 is repeated, except that the Aerosol MA is not dissolved in the monomer phase but is added instead to the aqueous phase. A good freeze-thaw and mechanically stable emulsion is obtained, having emulsion properties substantially equal to those of the emulsion of Example 1 (see Table 1) demonstrating that it is not essential to dissolve emulsifier in monomers in this system in order to obtain a stable emulsion.

TABLE 1

| Example | Percent Conversion | Percent Solids in Stripped and Concentrated Product | pH | Coagulation Percent | Mechanical Stability in Days | Freeze-Thaw Stability Cycles |
|---|---|---|---|---|---|---|
| 1 | 94.0 | 47.8 | 10 | nil | >23 | >21. |
| 2 | 93.6 | 47.4 | 10 | nil | >15 | >17. |
| 3 | | | 10 | >9 | | |
| 4 | 98.3 | 45.1 | 9.8 | nil | >16 | >14. |
| 5 | 98.3 | 45.0 | 9.8 | nil | >16 | 2. |
| 6 | | | 10 | | | 0. |
| 7 | 96.2 | 47.2 | 9.9 | nil | >15 | >10. |
| 8 | 97.8 | 51.3 | 9.8 | nil | >15 | >11. very viscous. |
| 9 | | | | >2 | | |
| 10 | 91.0 | | 9.9 | >4 | | 1. |
| 11 | 96.7 | 50.5 | 9.8 | about 0.2 | | >17. |
| 12 | 91.8 | 47.7 | 9.8 | nil | >15 | >12. |
| 13 | 98.2 | 49.2 | 9.8 | nil | >35 | >10. |
| 14 | 98.0 | 41.7 | 9.4 | nil | >21 | >15. |
| 15 | 96.3 | 41.5 | 9.4 | small trace | >35 | >15. |
| 16 | 98.0 | 51.3 | 7.2 | nil | >33 | >9. |
| 17 | 98.6 | 51.2 | 8.2 | nil | >40 | >5. |
| 18 | 96.3 | 50.8 | 8.1 | small trace | >40 | |

EXAMPLE 3

A monomer phase comprising methylstyrene and butyl acrylate in the relative weight ratios of 50:50 is treated in accordance with the procedure of Example 1. Substantial coagulation occurs which is directly attributed to the absence of α-unsaturated monocarboxylic acid monomer in the system. The product coagulates (approx. 10%) and has a very poor freeze-thaw stability, indicating the necessity of using an acrylic acid of the general formula with the emulsifier system. This material, due to the high percentage of coagulant, was not tested for stability. See Table 1.

As a practical matter, coagulation in excess of about 1% in a polymerized emulsion is considered disadvantageous because of the additional processing necessitated in the removal of the coagulant.

EXAMPLE 4

A monomer phase comprising butyl acrylate, methylstyrene, and methacrylic acid in the relative weight ratios of 52.5:46.5:1.0, respectively, are polymerized, using the emulsifier system and following the procedure of Example 1, except that ratio of monomers is changed and $(NH_4)_2S_2O_8$ is increased to 0.8% in order to increase polymer conversion to approximately 98%. The emulsion exhibits excellent characteristics. Results of tests with this emulsion are found in Table 1.

EXAMPLE 5

Butyl acrylate, methylstyrene, and arcylic acid in the relative weight ratio of 50:48:2, respectively, are copolymerized by the using of the emulsifier and according to the procedure of Example 1. A good freeze-thaw and mechanically stable emulsion is obtained. Test data and observations indicate that methacrylic acid when substituted for acrylic acid in this and most proportions, provides a somewhat preferable emulsion. The properties of this latex appear in Table 1.

EXAMPLE 6

A monomer phase, comprising butyl acrylate, methylstyrene, and methylolacrylamide in the relative weight ratios of 55:43:2, respectively, is polymerized in accordance with the procedure of Example 1. This latex, wherein the methylolacrylamide has replaced methacrylic acid, has no freeze-thaw stability and is demonstrative of the necessity of using a polymerizable α-unsaturated monocarboxylic acid monomer, which forms polymeric salts of a hydrophilic nature and confers freeze-thaw stability. As methylolacrylamide does not possess the properties of α-unsaturated monocarboxylic acids, it is not effective in producing freeze-thaw resistance.

In the butyl acrylate-methylstyrene-methacrylic copolymer, we have found that with increased butyl acrylate concentration, when using 1% methacrylic acid (the remainder being methylstyrene) and employing the same emulsifier system as set forth in Example 1 that there is a tendency toward increased coagulation during the polymerization reaction. This increase in coagulation may be inhibited by increasing the methacrylic acid content to 3% to 5% coagulation. This is illustrated by Examples 7 and 8 where the amount of coagulant obtained was minimized by increasing the methacrylic acid content.

EXAMPLE 7

A monomer phase comprising butyl acrylate, methylstyrene, and methacrylic acid in the relative weight ratio of 64:31:5, respectively, is copolymerized, using the triemulsifier system and following the procedure of Example 1. Good results are obtained. The characteristics of this emulsion are presented in Table 1.

EXAMPLE 8

A monomer phase comprising butyl acrylate, methylstyrene, and methacrylic acid in relative weight ratio of 57:40:3, respectively, is polymerized with the triemulsifier of, and following the procedure of Example 1. An emulsion having good freeze-thaw and mechanically stable properties is obtained. The results appear in Table 1.

EXAMPLE 9

The monomers comprising butyl acrylate, methylstyrene, and methacrylic acid in the relative weight ratio 52.5:46.5:1.0, respectively, are polymerized in accordance with the procedure of Example 1, except that the 1% Aerosol MA is replaced by sodium lauryl sulfate, available commercially as Duponol C. This variation in emulsifier results in a very high viscosity latex, difficult to handle and having about 2.0% coagulation. Not all of the monomer could be added as foaming becomes excessive and homogeneity of the emulsion begins to disappear because of the pasty consistency of the emulsion.

EXAMPLE 10

The monomers comprising butyl acrylate, methylstyrene, and methacrylic acid in the relative weight ratio 52.5:46.5:1.0, respectively, are polymerized following the procedure of Example 1, except that Aerosol MA is replaced by 1% sodium oleate, and sodium bicarbonate is added equivalent to the catalyst used. This formula proved unsuitable because of excessive coagulation and because of the comparatively low conversion, about 91%. See Table 1 for test data on the emulsion of this example.

Examples 9 and 10 demonstrate the necessity of the coexistence of the particular triemulsifier system and α-unsaturated monocarboxylic acid monomer.

The combination preferred in polymerizing the various monomers having the $CH_2=C<$ group is a ratio of about 1:1:1 Aerosol MA: Triton X–100: Dresinate 731, percentage by weight based on total monomer with from about 0.5% to about 10% of methacrylic acid.

With higher butyl acrylate to methylstyrene ratios when 1% methacrylic acid is employed, there is a tendency to increased coagulation. The introduction of about 10% acrylonitrile is found to inhibit effectively this increased coagulation which tends to take place in the absence of acrylonitrile. Copolymers containing acrylonitrile, as that of Example 12, when used in paint films also increase the resistance of the air-dried emulsion films to mineral spirits used in the paint.

EXAMPLE 11

The monomers comprising butyl acrylate, methylstyrene, acrylonitrile, and methacrylic acid in the relative weight ratio of 62:27:10:1, respectively, are polymerized with the triemulsifier of, and in accordance with the procedure of Example 1. Results of test data on this emulsion are found in Table 1.

In comparison to the acrylonitrile containing copolymer, it was found that a 62:37:1 ratio, respectively, of butyl acrylate, methylstyrene, and methacrylic acid copolymer and a 57:42:1 butyl acrylate, methylstyrene, and methacrylic acid copolymer latex had 10% and 9.2% coagulation, respectively, well in excess of the practical tolerable limit of about 1% coagulation.

Examples 12 to 14, which follow, illustrate the suitableness of the triemulsifier α-unsaturated monocarboxylic acid system with monomers other than butyl acrylate and methylstyrene.

EXAMPLE 12

Following the procedure of Example 1, a monomer phase comprising butyl acrylate, acrylonitrile, and methacrylic acid in the relative weight ratio of 60:39:1, respectively, is polymerized with the exception that $NaHCO_3$ is used as buffer in equivalent amounts to catalyst. Although reaction rates for butyl acrylate acrylonitrile are slower than that of the butyl acrylate methylstyrene, it is found that the former mixture may be added in about 2 hours. An emulsion with good freeze-thaw and mechanically stable properties, as shown in Table 1, is obtained.

EXAMPLE 13

Using an ethyl acrylate, methylstyrene, methacrylic monomer acid phase in the relative weight ratio of 50:49:1, respectively, and 0.5% by weight based on total monomers, of catalyst and following the procedure of Example 1, an excellent freeze-thaw stable emulsion having the properties set out in Table 1 was obtained. Good emulsions within a wide proportion range, i. e., 94:5 to about 5:94 ethyl acrylate to methylstyrene, respectively have been obtained.

EXAMPLE 14

Following the procedure of and utilizing the emulsifiers of Example 1, ethyl acrylate, acrylonitrile, and methacrylic acid monomers in the relative weight ratio 70:29:1, respectively, are copolymerized. In this formulation, it is found desirable to employ monomers at 45% concentration to reduce tendency to foaming and fouling which occurs in reactions with these monomers when higher concentrations are used. A good latex was obtained. Test data on the properties of the emulsion are found in Table 1.

EXAMPLE 15

The monomers and procedure employed are the same as Example 14, except that 1% Duponol C is used in place of the 1% Aerosol MA. However, as Duponol C is not soluble in the monomer phase, it is added with other emulsifiers in the aqueous phase. The properties obtained in the polymer emulsion of this example (see Table 1) illustrates that variations using other triemulsifier systems may be workable with specific monomers, but the scope of application is relatively restricted, cf. Examples 9 and 10, where the substitution of Duponol C and sodium oleate in the system gave impractical results.

Using the emulsifier system of, and following the procedure described in Example 1, good freeze-thaw and mechanically stable emulsions having the properties shown by the test data in Table 1 are obtained for the monomer systems of Examples 16 through 18.

EXAMPLE 16

Vinyl propionate, vinyl acetate, and methacrylic acid in the relative weight ratio of 50:49:1, respectively.

EXAMPLE 17

Vinyl propionate, vinyl acetate, and methacrylic acid in the relative weight ratio of 70:29:1, respectively.

EXAMPLE 18

Vinyl propionate, vinyl acetate, and methacrylic acid in the relative weight ratio of 90:9:1, respectively.

In practicing the invention, various plasticizers, pigments, fillers, and the like may be employed without departing from the scope of the invention.

In addition to ammonium persulfate, other catalysts, such as potassium persulfate, hydrogen peroxide, benzoyl peroxide, and the like may be employed. However we prefer to use ammonium persulfate.

It is essential to the stability of the emulsions of the instant invention that the composition have a pH greater than 7 and preferably a pH in the range of 9 to 10. Various alkaline materials may be employed to adjust the pH, such as ammonia, sodium hydroxide, amines, and the like. However, we prefer to employ concentrated ammonia.

It will be apparent that various modifications are possible within the scope of the instant invention, and any enumeration of specific details is not intended to limit the invention except as defined in the appended claims.

We claim:

1. A thermoplastic freeze-thaw and mechanically stable aqueous copolymer latex composition having a pH within the range of 9 to 11 comprising the reaction product in the presence of (1) a triemulsifier system of (a) ethylene oxide condensation product of octyl phenol, (b) the sodium salt of disproportionated rosin acids, and (c) the dihexyl ester of sulfosuccinic acid in substantially equal weight percentages of about 1% based on the total weight of the monomers, of (2) methacrylic acid monomer in amounts of between 0.5% and 10% by weight based on the total weight of monomer constituents, and (3) at least two different compounds selected from the group consisting of styrene, ring-substituted monomethylstyrene and dimethylstyrene, alkyl acrylates and methacrylates containing from 1–4 carbon atoms in the alkyl group, vinyl esters of saturated acids having 1–3 carbon atoms, and acrylonitrile, each being present in amounts of at least 5% by weight based on the total weight of the monomers.

2. A thermoplastic freeze-thaw and mechanically stable aqueous copolymer latex emulsion having a pH between 9 to 11 comprising the reaction product in the presence of (1) a three-component emulsifier system comprising essentially (a) the ethylene oxide condensation product of octyl phenol, (b) the sodium salt of disproportionated rosin acids, and (c) the dihexyl ester of sulfosuccinic acid in substantially equal amounts of at least about 1% based on the total weight of the monomers, of (2) methacrylic acid monomer in amounts within the range of about 1% and 5% by weight based on the total weight of the monomers, and (3) at least two different compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, each of which is present in amounts of at least 5% by weight based on the total weight of the monomers.

3. A thermoplastic freeze-thaw and mechanically stable aqueous copolymer composition having a pH falling within the range 9 to 11 comprising the reaction product in the presence of (1) a three-component emulsifier system comprising essentially (a) the ethylene oxide condensation product of octyl phenol, (b) the sodium salt of disproportionated rosin acids, and (c) the dihexyl ester of sulfosuccinic acid, in amounts of about 1% by weight based on the total weight of the monomers comprising butyl acrylate, ring-substituted monomethylstyrene, and methacrylic acid in approximate weight ratios ranging from 40:59.5:0.5 to 70:25:5, respectively.

4. A thermoplastic freeze-thaw and mechanically stable aqueous copolymer emulsion composition having a pH within the range 9 to 11 comprising the reaction product in the presence of (1) a three-component emulsifier system comprising essentially (a) the ethylene oxide condensation product of octyl phenol, (b) the sodium salt of disproportionated rosin acids, and (c) the dihexyl ester of sulfosuccinic acid, each component present in substantially equal amounts of about 1% based on the total weight of the monomers, of (2) methacrylic acid in amounts of between 0.5% and 10% by weight based on the total weight of the monomer content, and (3) ethyl acrylate and ring-substituted monomethylstyrene, each being present in amounts of at least 5% by weight based on the total weight of the monomers.

5. A thermoplastic freeze-thaw and mechanically stable aqueous copolymer latex composition having a pH within the range of 9 to 11 comprising the reaction product in the presence of (1) a triemulsifier system comprising essentially (a) the ethylene oxide condensation product of octyl phenol, (b) the sodium salt of disproportionated rosin acids, and (c) the dihexyl ester of sulfosuccinic acid in percentage amounts by weight of about 1% based on the total weight of the monomer, of (2) methacrylic acid monomer in amounts of between about 1% and 5% by weight based on the total weight of monomer constituents, and (3) butyl acrylate, ring-substituted monomethylstyrene, and acrylonitrile in amounts within the ranges 55% to 70%, 44% to 14%, and 5% to 15%, respectively, based on the total weight of the monomers.

6. A thermoplastic freeze-thaw and mechanically stable aqueous copolymer latex emulsion having a pH between 4 and 7 comprising the reaction product in the presence of (1) an emulsifier system comprising essentially (a) the ethylene oxide condensation product of octyl phenol, (b) the sodium salt of disproportionated rosin acids, and (c) the dihexyl ester of sulfosuccinic acid in substantially equal amounts of about 1% based on the total weight of the monomers, of (2) methacrylic acid monomer in amounts within the range of about 1% to 5% by weight based on the total weight of the monomer constituents, and (3) vinyl acetate and vinyl propionate, each of which is present in amounts of at least 5% by weight based on the total weight of the monomers present.

7. The method of making a freeze-thaw and mechanically stable emulsion by copolymerizing at least three different monoethylenically unsaturated polymerizable monomers which comprises reacting at least two compounds selected from the group consisting of styrene, ring-substituted monomethylstyrene, and dimethylstyrene, alkyl acrylates and methacrylates containing from 1-4 carbon atoms in the alkyl group, vinyl esters of saturated acids having 1-3 carbon atoms, and acrylonitrile, with a polymerizable acid selected from the group consisting of acrylic and methacrylic acids, said acid being present in amounts of between 0.5% and 10% by weight based on the total weight of the monomers, the other monomers being present in amounts of at least 5% by weight based on the total weight of the monomers, at a temperature from about 80° C. to reflux in an aqueous phase in the presence of a three-component emulsifier system comprising essentially (a) an alkyl-substituted phenolic ether-ethylene oxide condensation product, (b) an alkali metal salt of disproportionated rosin acids, and (c) an alkyl ester of sodium sulfosuccinic acid, each emulsifier being present in substantially equal weight percentages of between about 0.5% and 1.5% based on the total weight of monomers present, adding catalyst to the aqueous phase from a time preceding addition of the monomer phase at such a rate as the addition thereof will extend beyond the addition of acid monomer phase and adjusting the pH of the reaction product to greater than pH 7.

8. A method of making a freeze-thaw and mechanically stable emulsion by copolymerizing at least three different monoethylenically unsaturated polymerizable monomers, which comprises reacting at least two compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, with a polymerizable acid selected from the group consisting of acrylic and methacrylic acids, said acid being present in amounts of between 0.5% to about 10% by weight based on the total weight of the monomers, at temperatures from about 80° C. to reflux in an aqueous phase in the presence of a three-component emulsifier system comprising essentially (a) the ethylene oxide condensation product of octyl phenol, (b) the sodium salt of disproportionated rosin acids, and (c) the dihexyl ester of sodium sulfosuccinic acid, each emulsifier being present in substantially equal weight percentages of about 1% based on the total weight of monomers present, adding an aqueous ammonium persulfate catalyst solution to the aqueous phase from a time preceding addition of the monomer phase and at such a rate as the addition thereof will extend beyond the addition of the monomer phase, and adjusting the pH of the reaction product to within the range of 9 and 11.

9. A method of making a freeze-thaw and mechanically stable emulsion by copolymerizing at least three different monoethylenically unsaturated polymerizable monomers, which comprises reacting methacrylic acid with at least two compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, said acid being present in amounts of between 0.5% to about 10% by weight based on the total weight of the monomers, the other monomers being present in amounts of at least 5% by weight based on the total weight of the monomers at a temperature of from between about 90° C. to 95° C. in an aqueous phase in the presence of a three-component emulsifier system comprising essentially (a) the ethylene oxide condensation product of octyl phenol, (b) the sodium salt of disproportionated rosin acids, and (c) the dihexyl ester of sodium sulfosuccinic acid, each emulsifier being present in substantially equal amounts of about 1% by weight based on the total weight of the monomers present, adding ammonium persulfate catalyst to the aqueous phase from a time preceding addition of the monomer phase and at such a rate as the addition thereof will extend beyond the addition of the monomer phase, and adjusting the pH of the reaction product to within the range of 9 and 11.

10. The method of making a freeze-thaw and mechanically stable emulsion by copolymerizing methacrylic acid with at least two compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, said acid being present in amounts of between 0.5% and 5% by weight based on the total weight of the monomers, the other monomers being present in amounts of at least 5% by weight based on the total weight of the monomers at a temperature of from about 90° C. to 95° C. in an aqueous phase in the presence of a three-component emulsifier system comprising essentially (a) the ethylene oxide condensation product of octyl phenol, (b) the sodium salt of disproportionated rosin acids, and (c) the dihexyl ester of sodium sulfosuccinic acids, each emulsifier being present in substantially equal relative amounts of about 1% by weight based on the total weight of the monomers, adding ammonium persulfate catalyst to the aqueous phase from a time preceding addition of the monomer phase and at such a rate as the addition thereof will extend beyond the addition of the monomer phase, concentrating the solids content of the emulsion, adjusting the pH of the reaction product to within the range of 9 and 11 with ammonia.

11. A thermoplastic freeze-thaw and mechanically stable aqueous copolymer emulsion composition having a pH greater than 7 comprising the reaction product in the presence of (1) a three-component emulsifier system comprising essentially (a) an alkyl substituted phenolic ether-ethylene oxide condensation product, (b) an alkali metal salt of disproportionated rosin acids, and (c) an alkyl ester of sulfosuccinic acid, each component being present in substantially equal weight percentages of between about 0.5% and 1.5% based on the total weight of the monomer constituents of (2) a polymerizable acid selected from the group consisting of acrylic and methacrylic acids in amounts of between 0.5% and 10% by weight based on the total weight of the monomers, and (3) at least two different compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, each being present in amounts of at least 5% by weight based on the total weight of the monomers.

12. A thermoplastic freeze-thaw and mechanically stable aqueous copolymer emulsion composition having a pH within the range 9 to 11 comprising the reaction product in the presence of (1) a three-component emulsifier system comprising essentially (a) the ethylene oxide condensation product of octyl phenol, (b) the sodium salt of disproportionated rosin acids, and (c) the dihexyl ester of sulfosuccinic acid, each component being present in substantially equal amounts of between 0.5% and 1.5% by weight based on the total weight of the monomers of (2) a polymerizable acid selected from the group consisting of acrylic and methacrylic acids in amounts of between 0.5% and 10% by weight based on the total weight of the monomers, and (3) at least two different compounds selected from the group consisting of styrene, ring-substituted monomethylstyrene and dimethylstyrene, alkyl acrylates and methacrylates containing from 1-4 carbon atoms in the alkyl group, vinyl esters of saturated acids having 1-3 carbon atoms, and acrylonitrile, each being present in amounts of at least 5% by weight based on the total weight of the monomers.

References Cited in the file of this patent

UNITED STATES PATENTS

| | | |
|---|---|---|
| 2,473,929 | Wilson | June 21, 1949 |
| 2,635,086 | Norris | Apr. 14, 1953 |